(12) United States Patent
Tawfik

(10) Patent No.: US 7,836,164 B2
(45) Date of Patent: Nov. 16, 2010

(54) EXTENSIBLE NETWORK DISCOVERY SUBSYSTEM

(75) Inventor: Sherif Tawfik, Foster City, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 179 days.

(21) Appl. No.: 12/203,083

(22) Filed: Sep. 2, 2008

(65) Prior Publication Data

US 2010/0057827 A1    Mar. 4, 2010

(51) Int. Cl.
 *G06F 15/16* (2006.01)
(52) U.S. Cl. ............... 709/223; 709/206; 709/216; 709/224; 709/225
(58) Field of Classification Search ........... 709/206, 709/216, 223, 224, 225
See application file for complete search history.

(56) References Cited

U.S. PATENT DOCUMENTS

| | | | |
|---|---|---|---|
| 6,269,099 B1 | 7/2001 | Borella | |
| 6,519,571 B1 | 2/2003 | Guheen | |
| 7,124,101 B1 | 10/2006 | Mikurak | |
| 7,139,823 B2 * | 11/2006 | Benfield et al. | 709/224 |
| 7,181,547 B1 * | 2/2007 | Millet | 709/251 |
| 7,249,173 B2 | 7/2007 | Nicolson | |
| 7,272,636 B2 * | 9/2007 | Pabla | 709/216 |
| 7,343,409 B1 * | 3/2008 | Kremer et al. | 709/224 |
| 2002/0161883 A1 | 10/2002 | Matheny | |
| 2006/0123104 A1 | 6/2006 | Spinelli | |
| 2006/0146731 A1 | 7/2006 | Lewis | |
| 2006/0184693 A1 * | 8/2006 | Rao et al. | 709/245 |

FOREIGN PATENT DOCUMENTS

WO    WO2007005131    1/2007

* cited by examiner

*Primary Examiner*—Jinsong Hu
(74) *Attorney, Agent, or Firm*—Trellis IP Law Group, PC

(57) ABSTRACT

Particular embodiments generally relate to an extensible network discovery system. In one embodiment, a device may be able to communicate with a plurality of other devices that may communicate using different discovery protocols. For example, the device may include a discovery component that includes a plurality of discovery protocol plug-ins. The plug-ins enable communication using different discovery protocols. An application layer format is provided for applications of a device to communicate with the discovery component. The discovery component can then translate messages from the application layer format to a format compatible with each discovery protocol. Accordingly, applications do not need to know each discovery protocol format. Also, devices can communicate with different devices that may be configured to communicate using different discovery protocols.

20 Claims, 6 Drawing Sheets

EXTENSIBLE NETWORK DISCOVERY SUBSYSTEM

BACKGROUND

Particular embodiments generally relate to an extensible network discovery system.

Different protocols exist for allowing devices connected to a network to discover the services offered by the devices. For example, within a home network, devices can be connected to the network and convey the services that they offer to other devices. This allows devices to learn about the services offered by other devices connected to the network.

Conventionally, devices can discover themselves for the purpose of communicating using one discovery protocol. For example, a device that is configured to use universal plug and play (UPnP) can only communicate with other UPnP devices. Thus, if a device that uses another protocol, such as Bonjour™, to connect to the network, the UPnP device cannot communicate with a device using Bonjour™ to discover the services offered by that device. This defeats the purpose of having network discovery of devices.

SUMMARY

Particular embodiments generally relate to an extensible network discovery system. In one embodiment, a device may be able to communicate with a plurality of other devices that may communicate using different discovery protocols. For example, the device may include a discovery component that includes a plurality of discovery protocol plug-ins. The plug-ins enable communication using different discovery protocols. An application layer format is provided for applications of a device to communicate with the discovery component. The discovery component can then translate messages from the application layer format to a format compatible with each discovery protocol. Accordingly, applications do not need to know each discovery protocol format. Also, devices can communicate with different devices that may be configured to communicate using different discovery protocols.

In one embodiment, a first device determines a discovery message to send to other devices. The first device may determine which plug-ins to use based on a policy. For example, the first device may send the discovery message using each plug-in. This would ensure that all other devices in the network would be able to read the message. The discovery message is then translated from the application layer format to a format for the discovery protocols associated with the plug-ins. The discovery message is then sent to the second device. For example, the second device may be associated with an UPnP discovery protocol and can read an UPnP message that is received from the first device.

A further understanding of the nature and the advantages of particular embodiments disclosed herein may be realized by reference of the remaining portions of the specification and the attached drawings.

DETAILED DESCRIPTION OF EMBODIMENTS

Figure 1:
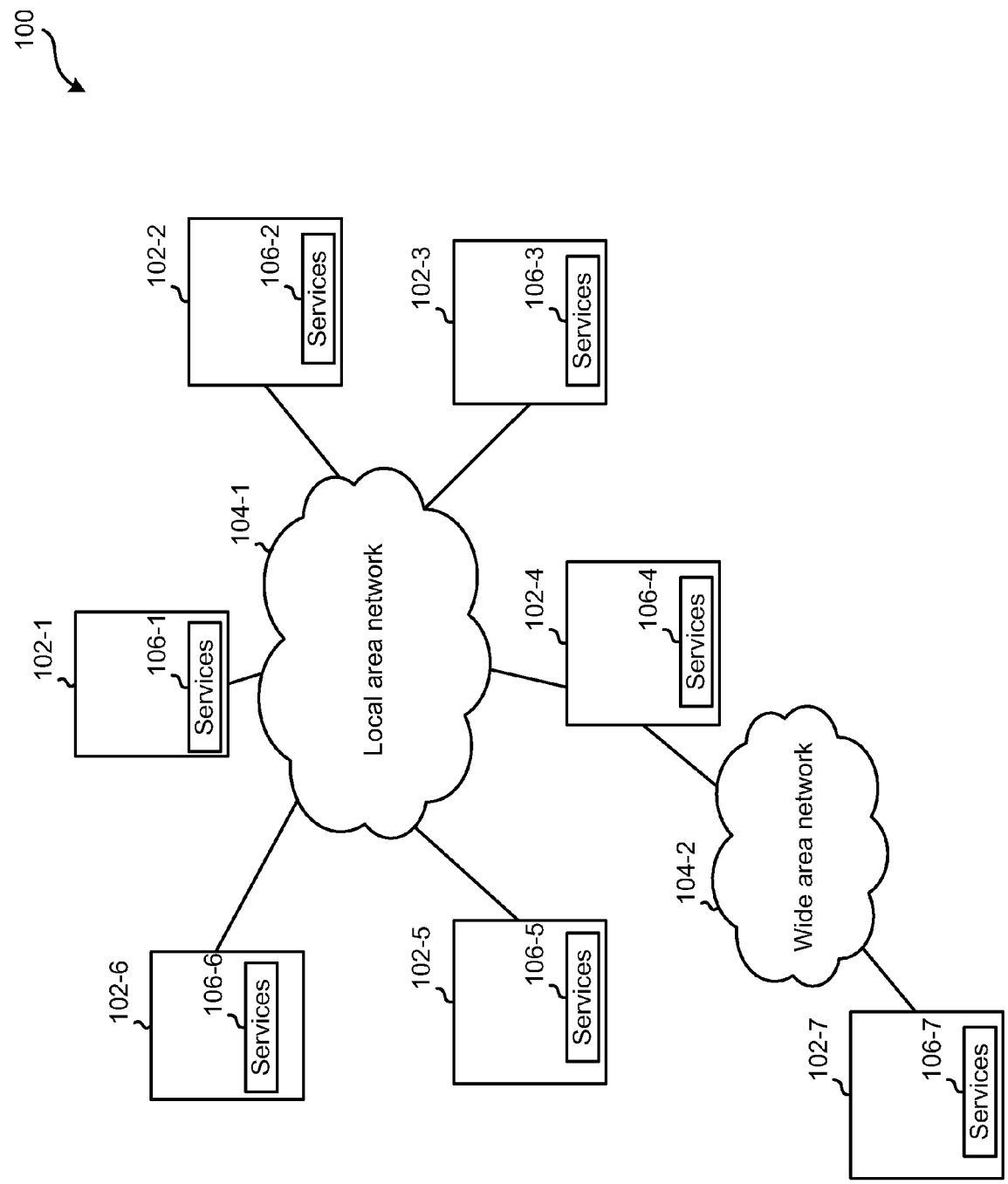
FIG. 1 depicts a simplified system for providing network discovery according to one embodiment.

FIG. 1 depicts a simplified system 100 for providing network discovery according to one embodiment. As shown, a plurality of devices 102 and networks 104 are provided.

Devices 102 may be computing devices that can connect to network 104. For example, devices 102 may include personal computers, laptop computers, cellular phones, personal digital assistants, cameras, access points, control points, servers, workstations, or other suitable computing devices. In one embodiment, various consumer electronic devices may connect to network 104.

Networks 104 may connect devices 102 together. In one example, network 104-1 is a local area network (LAN). For example, network 104-1 may be a local network found in an area, such as a user's residence, an office building, campus, etc. Network 104-2 may also be a wide area network (WAN), such as the Internet. Networks 104 may be wireless networks, wired networks, or any other combination thereof Each device 102 may include services 106. Services 106 may be any services that may be offered by device 102. Services can include any actions or capabilities that can be performed with the device. For example, a printer may include a print service, a camera may include a picture-taking service, and a personal computer may include many different applications that provide services, such as music services, video services, etc.

Devices 102, when they connect to network 104, may be discovered. For example, different devices 102 may be control points that are configured to discover the devices. In discovering devices, information about device 102, such as its identification information (e.g., an Internet Protocol (IP) address, communication protocol or other information that can be used to determine where the device and service are located and how to communicate with it), may be discovered in addition to a list of services 106 that are provided by the device. Other information may also be discovered, such as metadata about device 102.

Device discovery allows devices 102 to automatically discover each other. Thus, a device 102 can dynamically join a network, obtain an IP address, convey its services, and learn about the presence and services of other devices 102 connected to the network. Devices 102 can subsequently communicate with each other directly. Once devices 102 have been discovered, they may communicate with each other to have services performed. For example, device 102-1 may communicate with device 102-2 to have a service performed.

In one example, different devices 102 may be associated with different discovery protocols. Discovery protocols include UPnP, Bonjour™ (Zeroconf), etc. Devices that communicate using a different protocol conventionally could not communicate with each other in disparate protocols. However, particular embodiments provide a discovery subsystem that allows a device to communicate with multiple devices that communicate using different discovery protocols.

Figure 2:
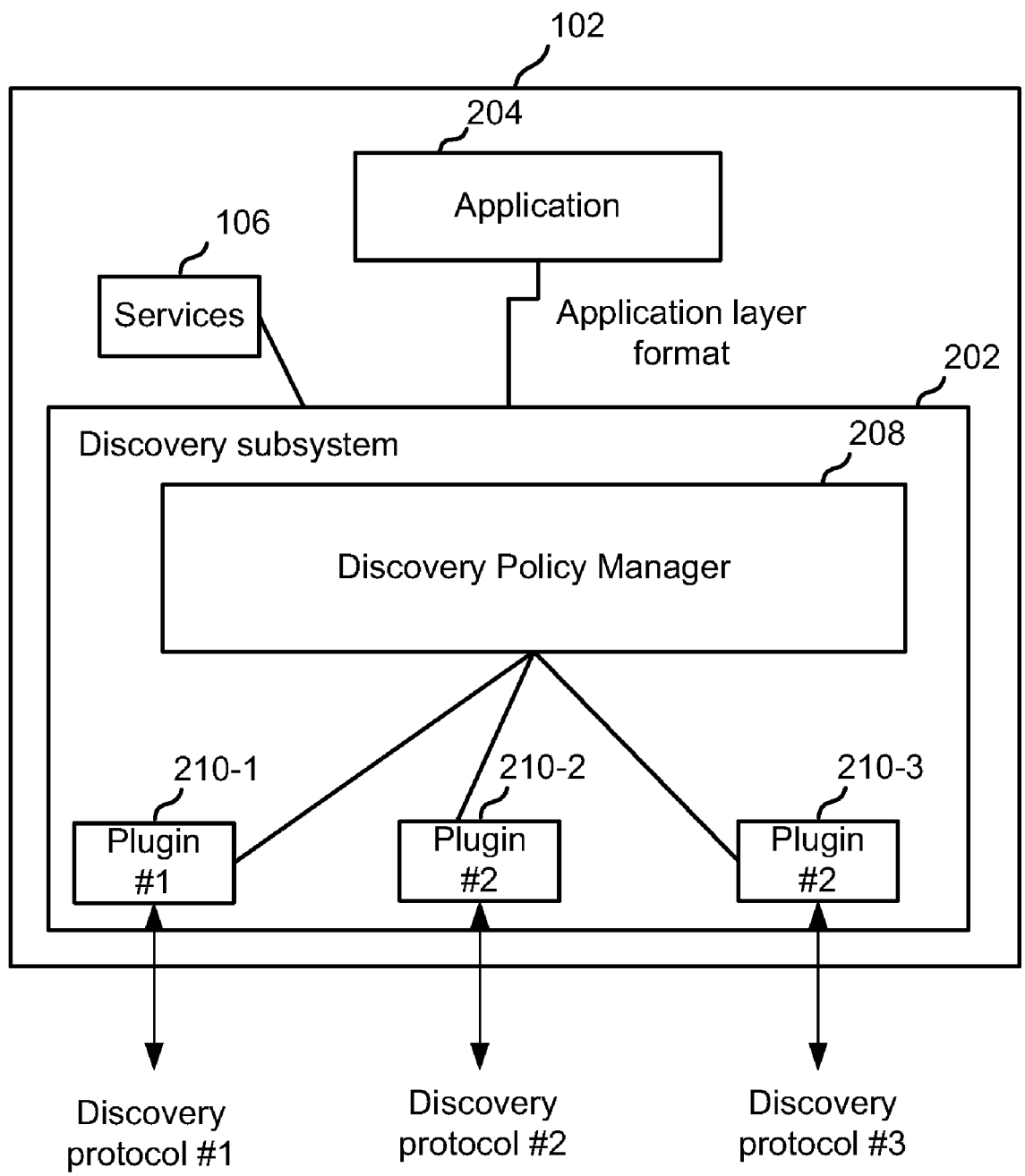
FIG. 2 depicts a more detailed example of device including a discovery subsystem 202 according to one embodiment.

FIG. 2 depicts a more detailed example of device 102 including a discovery subsystem 202 according to one embodiment. An application 204 may be an application that is configured to use services offered by other devices 102.

Application 204 may be used to communicate with other devices to have services performed.

Discovery subsystem 202 is configured as middleware to allow application 204 to discover services to allow it to communicate with other devices 102. Discovery subsystem 202 includes a discovery policy manager 208 and plug-ins 210. Plug-ins 210 may be associated with different discovery protocols. For example, each plug-in 210 is associated with a discovery protocol and can communicate with devices 102 using the discovery protocol.

Discovery policy manager 208 is configured to manage communication between application 204 and plug-ins 210. For example, application 204 may be configured to communicate in an application layer format. That is, discovery policy manager 208 provides a generic interface to application 204 that is not discovery-protocol specific. Accordingly, the application layer may be isolated from the network discovery layer. Thus, application 204 does not need to know how to communicate with other devices 102 using a specific discovery protocol. Rather, discovery policy manager 208 manages communications from application 204 to other devices 102 based on a policy using plug-ins 210. Accordingly, applications 204 can be configured to communicate using the application layer format. The applications do not need to know multiple discovery protocols. This is also useful when additional discovery protocols are added because applications would not need to be aware of how to use the additional discovery protocols. Rather, a new plug-in may be added to device 102 instead of changing multiple applications to use the additional discovery protocol. In one example, when new or proprietary discovery protocols are used, new plug-ins 210 can be provided in discovery subsystem 202. Discovery policy manager 208 may then automatically use the new plug-in 210.

Some or all of devices 102 may include discovery subsystem 202. These devices may then communicate using the discovery protocols in which plug-ins 210 are included. In some embodiments, devices 102 may be configured with different plug-ins 210. Also, not all devices 102 may include discovery subsystem 202. Rather, some devices may be configured to communicate with a single discovery protocol without using discovery subsystem 202. For example, a UPnP device may be configured to only communicate using UPnP. Because different devices 102 may be configured to communicate using different discovery protocols, devices may be used to bridge communication between devices and also to aggregate discovery information.

A device 102 that can communicate with devices using multiple discovery protocols may act as a proxy of discovery information. In one example, a discovery subsystem 202 may aggregate the services offered by multiple devices 102 where the devices communicate using different discovery protocols. The aggregated list of services may be stored. Accordingly, discovery subsystem 202 knows which services have been offered by most of or all of devices 102 connected to network 104. However, because some devices may not include discovery subsystem 202, they may only be able to store a list of services or know about devices 102 that communicate in their configured protocol. For example, a UPnP device may only know about services offered by UPnP devices connected to network 104.

Figure 3:
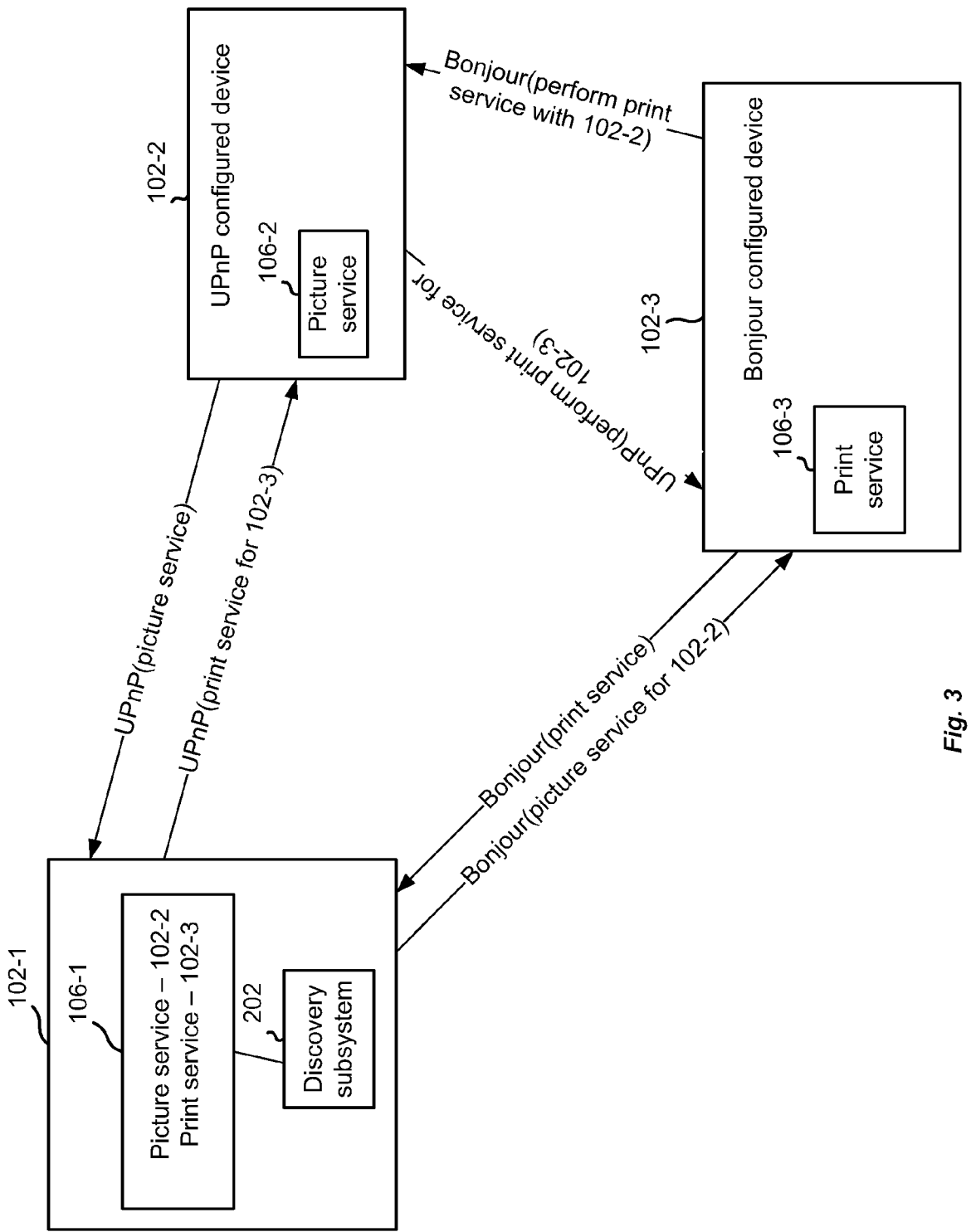
FIG. 3 depicts a simplified example of a system for communication according to one embodiment.

Also, some devices 102 may include discovery subsystem 202 but may not have all the plug-ins 210 for each discovery protocol. Accordingly, a proxy may use techniques to provide the above devices with discovery information for other protocols. FIG. 3 depicts a simplified example of a system for communication according to one embodiment. For example, a device 102-2 may want to communicate with a device 102-3; however, device 102-3 may communicate using a different discovery protocol. In the example, device 102-3 communicates using UPnP and device 102-3 communicates using Bonjour™. Device 102-1 includes a discovery subsystem 202.

Device 102-2 may discover services offered by device 102-3 through device 102-1, which includes a discovery subsystem 202. If device 102-3 offers a print service, it can communicate the service to device 102-1 using Bonjour™. Also, device 102-2 may communicate a picture processing service to device 102-1 using UPnP. Proxy device 102-1 can discover and aggregate the services offered by both devices 102-2 and 102-3 as shown in storage 302.

Proxy device 102-1 may then communicate to device 102-3 that device 102-2 is offering a picture processing service using Bonjour™ and communicate to device 102-2 that device 102-3 is offering a print service using UPnP. When a service is desired, device 102-3 may communicate with device 102-2. Device 102-1 may then communicate with device 102-2 to have the service performed. The intercommunication between device 102-2 and 102-3 may be in different protocols. For example, HyperText Transfer Language (HTTP), SOAP, or other proprietary protocols may be used. The discovery process may be used to define which protocol or language should be used to communicate between device 102-2 and device 102-3. Thus, device 102-1 acts as a bridge and may receive an indication of services in a first discovery protocol and translate the indication to another protocol to allow inter-device discovery without the devices being configured to use each other's discovery protocol. Devices 102-2 and 103-3 do not need to be configured to communicate using each other's discovery protocol. For example, a stack that allows communication for the other discovery protocol is not necessary.

The translation of protocol #1 to protocol #2 does not involve a direct mapping from protocol #1 to protocol #2. Rather, protocol #1 and protocol #2 are both mapped to the application layer format. Once in the application layer format, the message can be mapped to any protocol associated with a plug-in. That is, mappings from the application layer format to protocol #1 and protocol #2 are provided. To map from protocol #1 to protocol #2, protocol #1 is mapped to the application layer format, and then the application layer format is mapped to protocol #2. This alleviates cross-mapping between different protocols. If there were five protocols, mappings from protocol #1 to the other four protocols are not needed. Mappings from each protocol to the application layer format are used to perform mappings.

In another scenario, if a discovery subsystem 202 is included in a device but a plug-in is not included for a discovery protocol, the device may still discover services for other devices for that missing discovery protocol. For example, another protocol may be used to communicate the services instead of using the missing protocol. In one example, device 102-1 may choose to use a protocol in which device 102-2 has a plug-in, but the service may be offered by a device that using a different protocol. When receiving the message, discovery policy manager 208 may then convert the service to the application layer format, which can then be used to store the service. If the service is desired, the bridging discussed above may be used to have the service performed. Also, a format that is supported by all devices 102 that use a discovery subsystem may be used. Thus, all devices 102 with discovery subsystems may always be able to communicate no matter what plug-ins are installed.

Accordingly, discovery subsystem 202 allows more robust communication between devices 102 even when not all devices communicate using the same discovery protocols.

Figure 4:
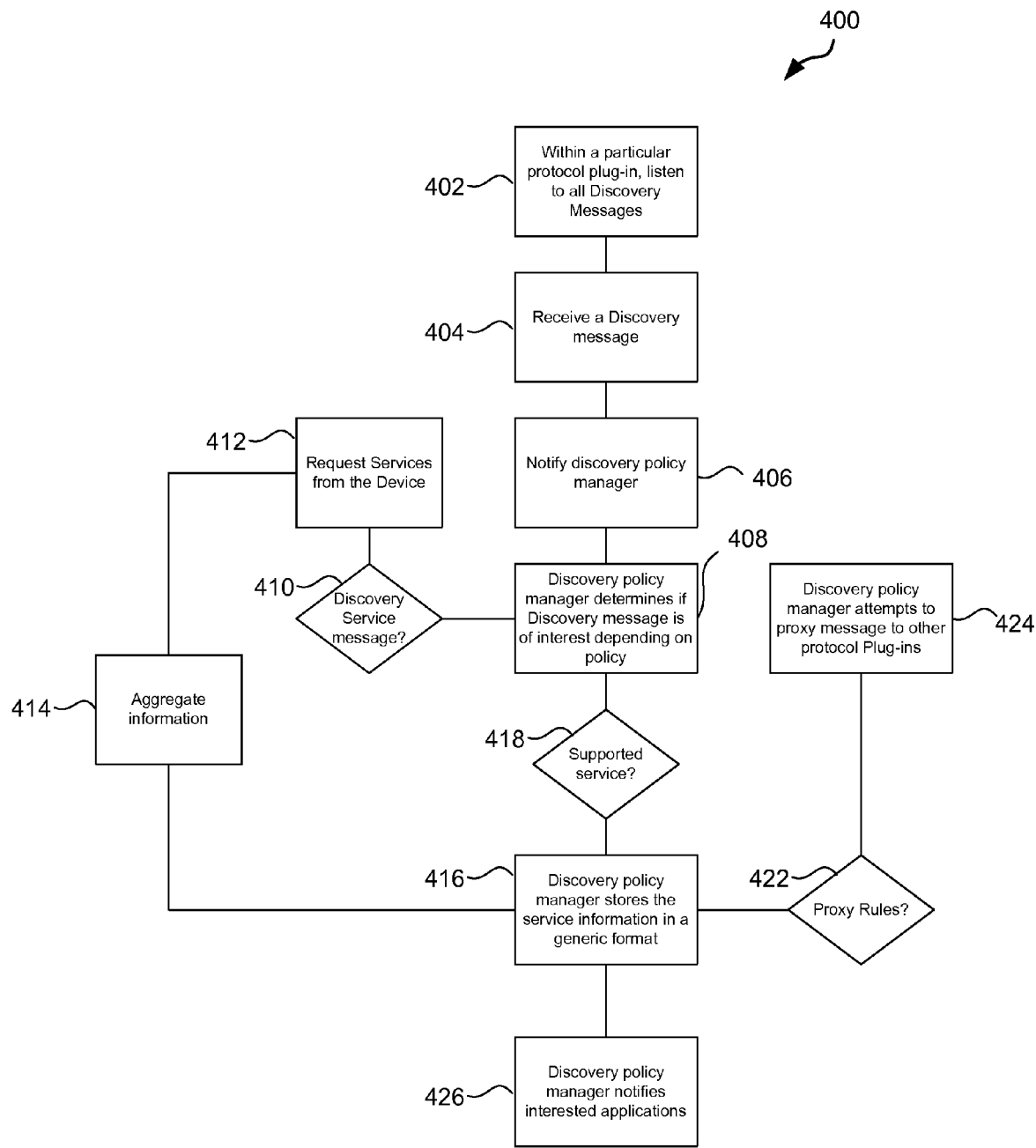
FIG. 4 depicts a simplified flowchart of a method for aggregating discovery messages according to one embodiment.

The following describes the processes of connecting to the network, advertising services, and having services performed. When different devices 102 connect to the network, they may be discovered. FIG. 4 depicts a simplified flowchart 400 of a method for aggregating discovery messages according to one embodiment. In this process, a device 102 is already connected to the network and receives a communication from a device 102 that is connecting to the network.

Step 402 listens to discovery messages using one or more plug-ins. Step 404 receives a discovery message in a discovery protocol. For example, when a device 102 connects to network 104, device 102 may advertise that it has joined the network. The discovery message may include a list of services for device 102 or may include a reference that allows device 102 to be contacted to request the list of services.

Step 406 contacts discovery policy manager 208. In step 408, discovery policy manager 208 determines if the discovery message is of interest based on a policy. For example, discovery policy manager 208 may be interested in discovery messages that are or certain class of services.

If the discovery message is a notification that a device 102 has services available (step 410), step 412 requests a list of services from device 102. For example, a message may be sent to device 102 requesting the services. Step 414 receives and aggregates the list of services. Step 416 then stores the list of services in the application layer format.

If the discovery message includes a list of services, step 418 determines if the services are supported. If they are supported, step 416 stores the list of services in the application layer format.

Discovery policy manager 208 may need to proxy the list of services to other devices. Step 422 determines if the list should be sent to other devices. Step 424 then sends the list via one or more of the plug-ins.

In step 426, discovery policy manager 208 also notifies any interested applications 204 that the services are available. The notification is sent in the application layer format.

Figure 5:
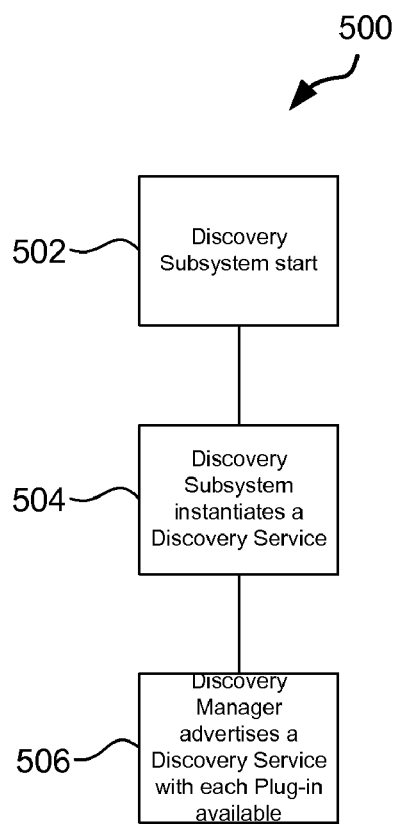
FIG. 5 depicts a simplified flowchart of a method for a device to advertise its services upon connecting to a network according to one embodiment.

After discovery, services 106 may be advertised. FIG. 5 depicts a simplified flowchart 500 of a method for device 102 to advertise its services upon connecting to a network according to one embodiment. FIG. 5 describes the process from the device that connects to the network while FIG. 4 described the process from the perspective of a device that was already connected to the network and received a discovery message.

Step 502 initiates operation of discovery subsystem 202. For example, device 102 may connect to network 104, such as a home network. In one example, a cellular phone my come within the range of a home network and connect to the network. Also, a new printer may be purchased and connected to the network.

Step 504 instantiates a discovery service. A discovery service is a discovery-subsystem 202 specific service that facilitates the sharing of discovery information among other devices with discovery subsystems 202, using any of the plug-in discovery protocols. Each plug-in 210 supported for the discovery subsystem 202 is able to advertise the discovery service. For example, this service is used to advertise the services offered by device 102. In step 506, discovery subsystem 202 advertises the discovery service with each plug-in available. The advertising may say that the device is available and a list of services can be requested or may send the list of services.

Figure 6:
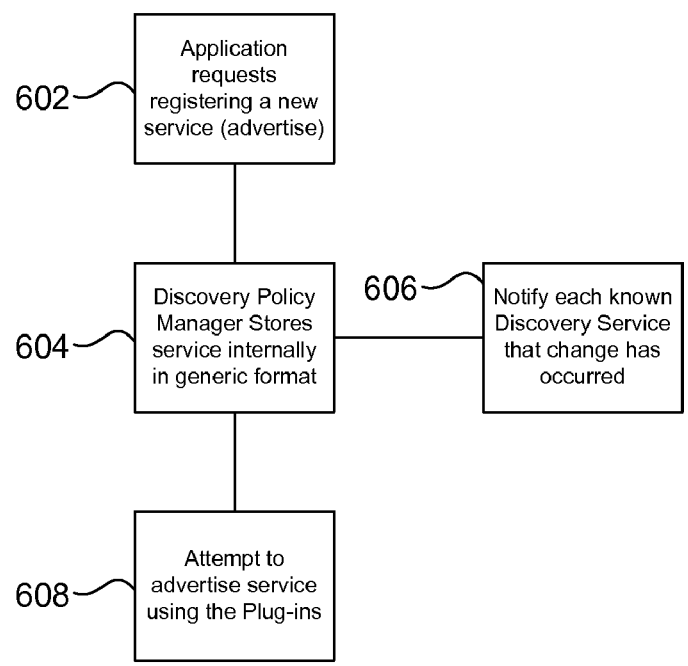
FIG. 6 depicts a method for advertising new services according to one embodiment.

FIG. 6 depicts a method for advertising new services according to one embodiment. In step 602, application 204 may request registering a new service. For example, a user may configure a device to perform a new service.

In step 604, discovery policy manager 208 may store the service in the application layer format. In step 606, discovery policy manager 208 notifies each known discovery service of other discovery subsystems 202 of devices 102 on the network that the list of services it is keeping has changed In step 608, the discovery policy manager 208 attempts to natively advertise the application service by direct mapping to each of the plug-ins. Each plug-in 210 attempts to map the service advertisement to its protocol, and if it is successful, the service is advertised to all protocol specific (such as UPnP) devices, that might not support discovery subsystem 202.

Figure 7:
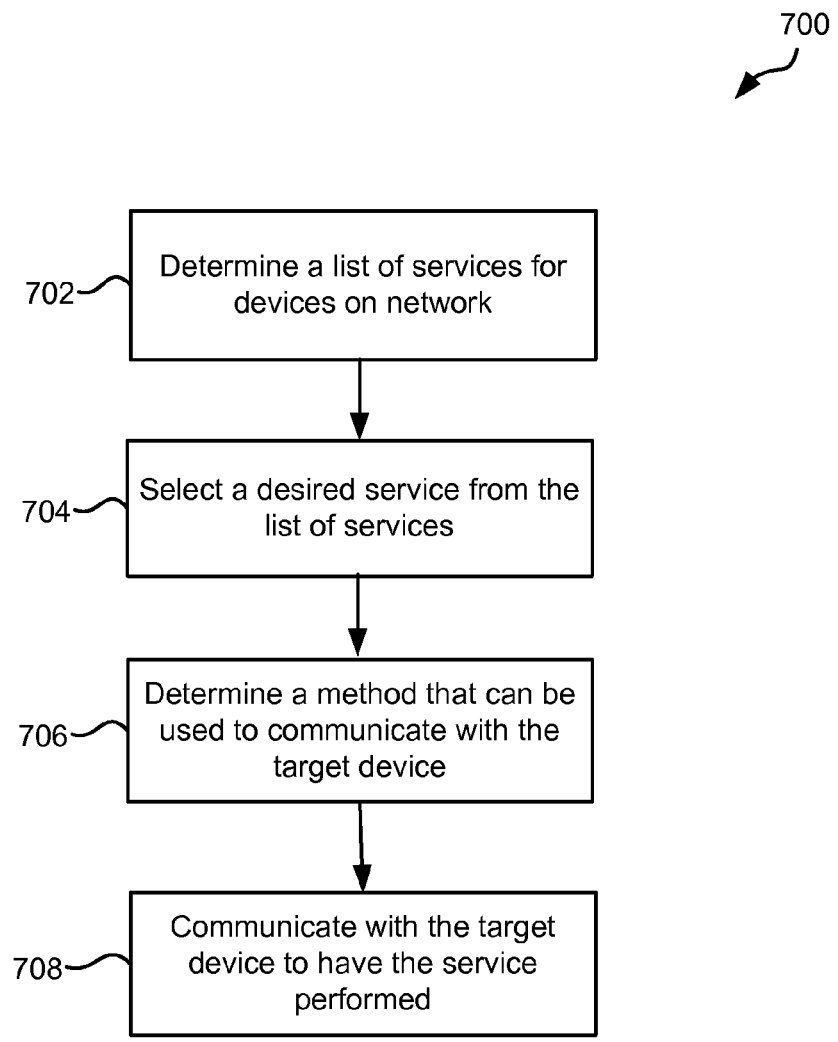
FIG. 7 depicts a simplified flowchart of a method for performing services according to one embodiment.

A device 102 may aggregate a list of services for multiple devices 102. At some point, device 102 may decide to have a service performed using another device 102. FIG. 7 depicts a simplified flowchart 700 of a method for performing services according to one embodiment. Step 702 determines a list of services for devices on network 104. For example, a list of services may have been aggregated from different devices that communicate using different discovery protocols. Application 204 may review services 106.

Step 704 selects a desired service from the list of services 106. For example, the desired service may be a service for printing a document. The service is associated with a target device that can perform the service.

Step 706 determines a method that can be used to communicate with the target device. For example, a target device may have advertised that it prefers to communicate in a certain protocol when it connected to network 104. As described above, the communication protocol used may be different from the discovery protocol used.

Step 708 then communicates with the target device to have the service performed.

Accordingly, applications 204 may be independent of different discovery protocols. The application layer can receive aggregated information about the availability of devices and services on network 104 in a uniform and technology-independent fashion. New or proprietary discovery technologies can be plugged in to discovery subsystem 202 as components. A discovery policy manager 208 can parse discovery messages and translate them to the application layer format that can be sent through an interface to the application layer. Accordingly, when different discovery technologies are used, plug-ins can be added to discovery subsystem 202. This does not require significant reconfiguration of application-level code. The extensibility of discovery subsystem 202 greatly increases compatibility and provides more capabilities to legacy applications/products even when new discovery technologies surface.

Although the description has been described with respect to particular embodiments thereof, these particular embodiments are merely illustrative, and not restrictive. Although discovery protocols were used as an example, it will be recognized that other discovery protocols will be appreciated.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for discovery of devices in a network, the method comprising:
    determining, at a first device, a discovery protocol from a plurality of discovery protocols, wherein the determined discovery protocol is for use in communicating with a second device in the network;
    generating a discovery message to send to the second device;
    determining a plug-in from among a plurality of plug-ins corresponding to the plurality of discovery protocols, wherein the determined plug-in is for use in sending the discovery message, the determined plug-in being compatible with the determined discovery protocol;
    translating the discovery message from an application layer format of an application on the first device to a format for the determined discovery protocol; and
    sending the translated discovery message via the determined plug-in to the second device such that the application communicates with the second device without knowing the determined discovery protocol.

2. The method of claim 1, further comprising:
    determining a list of services associated with devices in the network;
    determining a service in the list of services; and
    generating the discovery message for the service.

3. The method of claim 2, wherein services in the list of services are associated with devices on the network that use different discovery protocols.

4. The method of claim 1, further comprising adding a new plug-in when a new discovery protocol is added.

5. The method of claim 1, further comprising:
    receiving a discovery message from the second device indicating the second device is connected to the network; and
    requesting services offered from the second device using the determined discovery protocol.

6. The method of claim 5, further comprising:
    receiving a list of services offered by the second device in a message in the determined discovery protocol; and
    converting the message to the application layer format to store the list of services.

7. The method of claim 1, further comprising:
    translating from a first discovery protocol to a second discovery protocol by mapping each of the first and second discovery protocols to the application layer format.

8. The method of claim 7, wherein a message received at a first plug-in in the first discovery protocol is translated to the application layer format, and the translated received message is then translated from the application layer format to the second discovery protocol for sending via a second plug-in.

9. A computing device configured for discovery of devices in a network, the computing device comprising:
    a memory for storing a list of services offered by the computing device;
    an application on the computing device; and
    a discovery subsystem comprising:
        a plurality of plug-ins associated with a corresponding plurality of discovery protocols used to discover other devices in the network; and
        a discovery policy manager configured to manage communications between the application and the plurality of plug-ins by converting between an application layer format for the application to discovery protocols that are compatible with the plug-ins to allow communications with the other devices in the network using the plurality of discovery protocols such that the application communicates with the other devices without knowing any of the discovery protocols.

10. The computing device of claim 9, further comprising a second list of services offered by the other devices in the network.

11. The computing device of claim 10, wherein the second list of services include services offered by the other devices that communicate using different discovery protocols.

12. The computing device of claim 9, wherein the computing device acts as a bridge to a first device that communicates using a first discovery protocol and a second device that communicates using a second discovery protocol.

13. The computing device of claim 12, wherein a first plug-in receives a message from the first device in the first discovery protocol, and wherein a second plug-in sends a second message corresponding to the first message to the second device in the second discovery protocol.

14. The computing device of claim 13, wherein the discovery policy manager converts the first message into the application layer format message and then converts the application layer message to the second message in the second discovery protocol.

15. An apparatus comprising:
one or more processors; and
logic encoded in one or more tangible media for execution by the one or more processors, and when executed operable to:
determine, at a first device, a discovery protocol from a plurality of discovery protocols, wherein the determined discovery protocol is for use in communicating with a second device in a network;
generate a discovery message to send to the second device;
determine a plug-in from among a plurality of plug-ins corresponding to the plurality of discovery protocols, wherein the determined plug-in is for use in sending the discovery message, the determined plug-in being compatible with the determined discovery protocol;
translate the discovery message from an application layer format of an application on the first device to a format for the determined discovery protocol; and
send the translated discovery message via the determined plug-in to the second device such that the application communicates with the second device without knowing the determined discovery protocol.

16. The apparatus of claim 15, wherein the logic when executed is further operable to:
determine a list of services associated with devices in the network;
determine a service in the list of services; and
generate the discovery message for the service.

17. The apparatus of claim 16, wherein services in the list of services are associated with devices on the network that use different discovery protocols.

18. The apparatus of claim 16, wherein the logic when executed is further operable to add a new plug-in when a new discovery protocol is added.

19. The apparatus of claim 16, wherein the logic when executed is further operable to:
receive a discovery message from the second device indicating the second device is connected to the network; and
request services offered from the second device using the determined discovery protocol.

20. The apparatus of claim 19, wherein the logic when executed is further operable to:
receive a list of services offered by the second device in a message in the determined discovery protocol; and
convert the message to the application layer format to store the list of services.

* * * * *